UNITED STATES PATENT OFFICE.

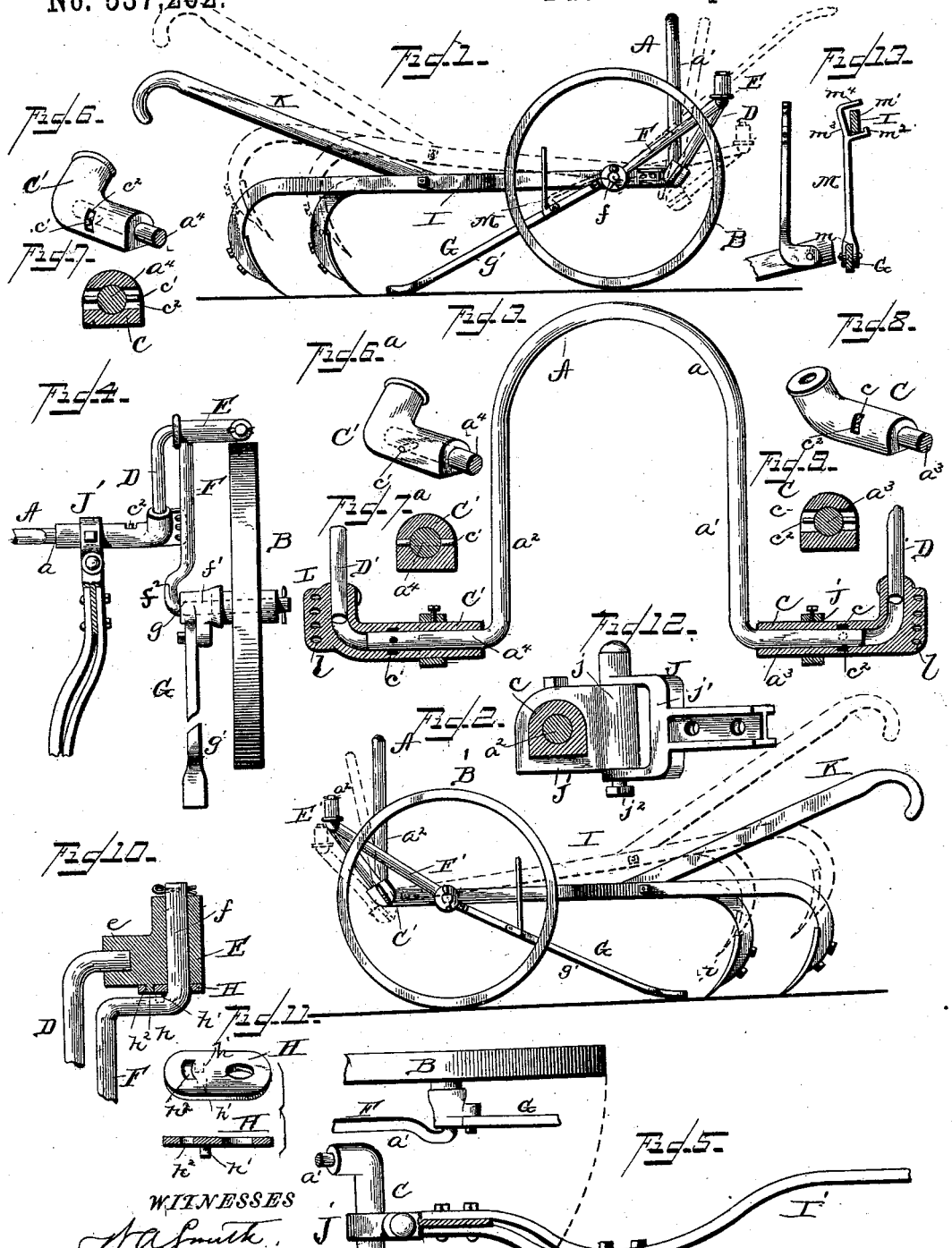

ROBERT H. AVERY, OF PEORIA, ILLINOIS; FREDERIC R. AVERY ADMINISTRATOR OF SAID ROBERT H. AVERY, DECEASED.

CULTIVATOR.

SPECIFICATION forming part of Letters Patent No. 537,262, dated April 9, 1895.

Application filed April 23, 1890. Serial No. 349,136. (No model.)

*To all whom it may concern:*

Be it known that I, ROBERT H. AVERY, a citizen of the United States, residing at Peoria, in the county of Peoria and State of Illinois, have invented certain new and useful Improvements in Cultivators, of which the following is a specification, reference being had therein to the accompanying drawings.

This invention relates to improvements in cultivators.

The object is to provide improved features of construction and arrangement in those which are known as tongueless cultivators, although from an examination of the drawings and the description which will be given below it will be seen that many of the features set forth can be employed with mechanism of any of the many sorts used upon farms.

Figure 1 is an elevation from one side of a cultivator of one of the forms embodying my improvements. Fig. 2 is an elevation from the opposite side. Fig. 3 shows the arched bar or connecting device, together with some of the adjacent parts in section. Fig. 4 is a plan view of the right hand end of said arched bar with its caster wheel and some of the adjacent parts. Fig. 5 is a plan view which in connection with Fig. 4 illustrates the arrangement of parts by which the caster wheels can have free inward and outward movement. Figs. 6, $6^a$, 7, $7^a$, 8, 9, 10, 11, 12 and 13 show details.

I will first describe the machine in Figs. 1 to 13.

A represents the arched bar or connecting part as a hole of the frame which holds together the two plow gangs. It is curved at the top as at $a$, has the vertical legs $a'$, $a^2$, and the outwardly curved spindle parts $a^3$, $a^4$.

B, B', represents the caster wheels which support the aforesaid parts and the forward ends of the plow gangs.

Between the arch and the caster wheels, the following parts are interposed: The spindle or end $a^3$ of the arch is fitted into a sleeve or elbow C, and is loosely connected therewith by means of a pin $c^2$ passing through slots at $c$ and engaging with said part $a^3$. The arch and the sleeve C are thus adapted to have a limited motion in relation to each other.

The sleeve receives an upward extending bar D. At its upper end it is turned outward and fitted into a socket piece E having a neck at $e$ to receive said bar D, and also having a vertical aperture. In the latter is fitted a bar F having the spindle or hinge portion $f$ fitted in the said aperture in the socket part E. The bar F is carried in at $f^2$, down and backward to the axial line of the caster wheel B, and is then turned outward so as to provide an axle $f'$ for the wheel. (See Fig. 4.) It also receives the hub portion $g$ of the runner G or device by which the plows are supported away from the ground when not in use.

The axle $f'$ of wheel B is situated behind the parts above described, to wit: those indicated by A, C, D, E, and F.

Now referring to the parts on the left side of the machine, to wit: those at C', D', E', F' and B', it will be seen that they are like those described.

If desired one of the spindles and its sleeve C or C' can be joined rigidly by a pin fixed in both as shown in Figs. $6^a$ and $7^a$.

The plow frames are substantially similar to each other except that they are shaped to correspond to their respective sides of the machine. Each has a coupling indicated by J, comprising a socket piece J' and a yoke $j'$ joined together by a hinge pin or bolt $j^2$. The socket piece J' is fitted to the sleeve C (or C') the latter being angular in section, and the socket having a corresponding angular aperture. The hinge pin $j^2$ passes through a tubular part $j^x$.

The plow beam I is bolted to the yoke piece. This beam I is curved inward as shown in Figs. 4 and 5 for the purpose of allowing the caster wheel to move in toward the central line of the machine farther than it could if said beam I were carried directly back. It carries one or more shovels as at $i$. Then in order to have one or more plows situated farther out, that is, nearer the line of travel of the wheel, supplemental beams as at I', are bolted to the coupling J or to that at I and are bent outward as shown in Fig. 5.

By an examination of the drawings it will be seen, first, that the line connecting the axis of the wheels B and B' is at some distance behind the arch A, the coupling J and other parts adjacent thereto and between the arch and the wheel axis; second, each plow gang can vibrate vertically with, but not independently of, its sleeve C or C', and, third, that said sleeves C and C' are respectively connected with the parts which extend therefrom up and forward and then back to the axles $f'$ in such way that should either sleeve be rocked around a horizontal line, the tendency is to produce a rocking of all parts between said sleeve and the axle $f'$, and, fourth, that the sleeves C and C' are independent of each other at least to a limited extent, as respects the described motion around a horizontal line.

As a result of these matters of construction and arrangement, it will be seen, first, that if both the plow beams are lifted up together by the handles K, the weight of the shovels and the rear part of the frames will be counterbalanced by all of the parts lying in front of the wheel axis; second, that either one of the plow frames can be lifted independently of the other; third, that if either plow beam be lifted independently of the other, all of those parts which are connected as above described with its sleeve C or C' and with its wheel axle will act to counterbalance the weight of the shovels; that is, said parts on each side of the machine in front of the axial line of the caster wheel tend to bear down and thereby balance one of the gang frames and its shovels independently of the other.

Fig. 1 illustrates by dotted lines the positions which the parts tend to assume on the right hand side; and the dotted lines Fig. 2 illustrate the positions which the parts on the left hand side tend to assume by reason of this construction and arrangement.

As the arch A is connected with the sleeves C and C', and therefore with the gang frames, it (the arch) assists in counterbalancing said frame, and when the shovels are lifted the arch tips forward somewhat, as shown in dotted lines, and as this arch is on one or both sides loosely connected by pins and slots, as at $c$ $c^2$ or equivalent to the sleeves C and C', more or less of its weight is utilized in balancing either gang frame; but when one of the gangs and the arch are connected rigidly the latter will operate somewhat differently in the balancing action but the same principle substantially will be preserved.

The draft devices are advantageously attached at L L, there being webs at these places cast integral with the sleeves C C', each having a series of apertures $l$ in which eye bolts or equivalent devices are fastened. As above stated the runners are hinged by means of the hubs $g$ to the axle parts $f'$. Supports for the gang beams are provided at M, they being bars hinged to the runners, and each having a shoulder at $m$ to act as a stop and having at the upper end a fork with a throat at $m'$ and guards at $m^2$, $m^3$, $m^4$ the two former acting to prevent the beam from moving laterally and the latter acting to prevent it from being accidentally thrown up out of the fork or rest. When the plows are in use, the drag bars can be lifted up and supported in any suitable way. For instance, they can be thrown over so as to rest upon the parts D, E and F. In such case the rest M turns down as shown in Fig. 1 and it and the drag bars assist in balancing the gang.

H represents a washer combined with the wheel, and preferably interposed between the wheel arm F and the coupling E. It has an aperture to receive the bar F loosely and a slot $h^2$ adapted to receive a lug $h$ on the part E. It has also two projections $h'$, $h'$ lying one on each side of the arm F, and they act to limit the play of the arm around the axis at $f$, in the part E.

I have above described in detail one form of machine embodying my improvements, but wish it to be understood that I do not limit myself to using in any one machine all of the same; or to embodying the principles respectively of the novel parts in devices of exactly the sort shown. There can be considerable variation both in regard to the separate parts and in regard to the machine considered as a whole.

I am aware of the fact that tongueless cultivators have been heretofore constructed in such a way that when both the plow frames were lifted, the parts adjacent to the arch and forward of the wheel axis could be used to counterbalance the shovels and shovel frames; but in said earlier machines, no provision was made for counterbalancing the weight of the shovels of each frame independently of those of the other frame. When the machine is in use, it is more frequently necessary for the operator to lift one gang than it is to lift both simultaneously.

I am also aware that cultivators, having tongues secured to the arches have been made with side frames for attaching the wheels, said side frames being hinged to the arch and having the plow beams secured thereto so that they were incapable of vertical movement independently of the said frames; but in the constructions referred to the tongue is necessarily present as otherwise the arch or connecting part would fall, and when one of the gangs is lifted the tongue and draft devices are correspondingly dropped and somewhat twisted.

It will be seen that in my case the arch is properly supported without a tongue and yet the independent counterbalancing of the gangs attained, and at the same time the wheels follow the lines of draft independently of each other, that is, one wheel may temporarily go forward of the other or be temporarily inclined to it. Thus I provide all the requisites of the ordinary tongueless cultivator and in addition to those, have the shovels or shovel gangs independently counterbalanced.

What I claim is—

1. In a tongueless cultivator, the combination of the supporting wheels, the horizontally and independently vibrating wheel carriers whereby the wheels can independently follow the lines of draft, and two independently counterbalanced shovels or gangs, the said wheels being mounted on said wheel carriers with their axes in or nearly in the horizontal plane of the gang beams and behind the hinged ends of the beams, substantially as set forth.

2. In a tongueless cultivator, the combination of the connecting frame, situated in front of the normal wheel axis, the two horizontally and independently vibrating wheel-carriers, whereby the wheels can independently follow the lines of draft, the two independently counterbalanced shovels or gangs secured to said frame, and wheels secured to the said wheel carriers with their axes in or nearly in the horizontal plane of the shovel beam, substantially as set forth.

3. In a tongueless cultivator the combination of the connecting frame between the wheels formed in two or more parts flexibly connected together and situated in front of the axis of the wheels, the shovel beams secured to different parts of said frame and at points in front of the wheel axes substantially as set forth whereby the gangs are counterbalanced independently of each other the wheels mounted on the connecting frame with their axes in or nearly in the horizontal plane of the shovel beam, as described.

4. In a tongueless cultivator, the combination of the connecting frame, comprising the arch or central part, in vertical planes in front of the wheel axes and the two side parts, said central part having a limited oscillation relatively to one or both of the side parts, the stops carried by the side parts which prevent the said central part from falling, the two independently counterbalanced shovels and the wheels mounted on the said side bars of the frame with their axes in or nearly in the horizontal plane of the shovel beam or gangs of shovels, substantially as set forth.

5. In a cultivator, the combination of the caster wheels, means for connecting said caster wheels, the plow gangs each connected rigidly in relation to vertical lines with the parts which are mounted on its caster wheel and joined by a horizontal hinge-like connection with the parts mounted on the other caster wheel, substantially as set forth.

6. In a tongueless cultivator, the combination of the two ground wheels having their axes in or nearly in the horizontal plane of the gang beam, the frame which connects them, the gang frames, and the two gang-frame supports vibrating independently of each other about the wheel centers respectively, each of said supports being connected rigidly in relation to vertical lines to its gang-frame, substantially as set forth, whereby each gang-frame support vibrates about its wheel independently of the wheel upon the opposite side of the machine, substantially as set forth.

7. In a tongueless cultivator, the combination of the two independent gang beams, the wheels having their axes in the horizontal plane of said beams, a frame as at D, E, F, adapted to rock on the axis of each wheel, and which frame is made in two parts one secured to the other by a vertical hinge, and the arch or connecting frame secured to one or both of said wheel frames by a horizontal hinge connection, substantially as set forth.

8. In a tongueless cultivator, the combination of the caster wheels, the two part frame hinged at the axis of each wheel, and having its two parts vertically hinged together, one of which parts extends down and back to the axis of the wheel, and the other of which parts extends down from the vertical hinge and back to the axis of the coupling of the plow frame, and the arch or connecting frame united to one or both of the last said parts of the wheel frames by horizontal hinge connections, substantially as set forth.

9. In a tongueless cultivator, the combination of the caster wheels, the wheel frames, the arch hinged to one or both of said wheel frames, and the plow frames united rigidly to the said wheel frames, substantially as set forth, whereby, although capable of horizontal vibration, they are incapable of vertical vibration independently of said wheel frames, substantially as set forth.

10. In a cultivator, the combination of the supporting wheels, the arch or connecting frame interposed between said wheels and adapted to rise and fall around their axes, and the plow frames secured to said connecting frame independently of each other at points in advance of the line which connects the axes of the wheels, and each adapted to rise and fall at the front end relatively to the axis of its wheel independently of the vertical movements of the other frame, substantially as set forth.

11. In a tongueless cultivator, the combination of the supporting wheels and two gang frames having their front ends supported at points in advance of the wheel axis and adapted to rise and fall independently of each other at said front ends, and means substantially as set forth connecting each plow gang with its wheel and adapted to rise and fall with said gang independently of the other, substantially as set forth.

12. In a cultivator, the combination of the arch, A, the caster wheels, means substantially as described for connecting said arch with said caster wheels, the coupling, C, loosely connected to said arch whereby they can rock in relation to each other, the plow frame secured to the said coupling, C, substantially as set forth, whereby it is incapable of vertical vibration relatively thereto, said coupling, C, being joined to the supporting devices of one of the wheels, and a second plow frame situated upon the other side of the machine, substantially as set forth.

13. The combination of the arch, A, the wheel, B, the wheel arm, F, the arm, D, hinged to the arm, F, the coupling, C, loosely connected to the arch, and the gang frame or plow connected substantially as described to said coupling.

14. The combination of the arch, A, the wheel, B, the wheel arm, F, the arm, D, the plow frame or beam secured rigidly to the arm, D, substantially as set forth, whereby it is incapable of vertical vibration relatively thereto, and means for flexibly connecting said arm, D, with the arch, substantially as set forth.

15. The combination of the wheels, the wheel arms, F F', the arms, D, D' respectively hinged to the arms, F F', a connecting means as at A, and the couplings as at C C', one hinged to said connecting means and the other rigidly secured thereto, substantially as set forth.

16. The combination of the arch, A, the wheel, B, the arm, D, extending forward and up from its point of connection with the arch, the arm, F, hinged to the arm, D, and extending inward and then backward toward the wheel axis, said axis being behind the point of attachment of the bar, D, with the arch, substantially as set forth.

17. The combination with the caster wheel and the arch or connecting means extending from one side of a row of plants to the other, of the wheel arm, F, bent to provide a hinge joint with said connecting means, bent inward as at $f^2$, and bent to form the wheel axle, substantially as set forth.

18. The combination of the arch, the tubular socket secured to said arch, the bar, D, secured to said socket, the coupling, E, receiving the said bar, D, the wheel arm, F, pivoted in said socket, E, and the wheel carried by said arm, F, substantially as set forth.

19. The combination with the caster wheels and their cross connecting frame, of the horizontally vibrating wheel-carrying arms F, bearings E therefor, and the vibrating stop plate H interposed between said arm F and the bearing, substantially as set forth.

In testimony whereof I affix my signature in presence of two witnesses.

ROBERT H. AVERY.

Witnesses:
J. H. ELWARD,
A. BOWN.